(12) United States Patent
Min et al.

(10) Patent No.: US 10,538,665 B2
(45) Date of Patent: Jan. 21, 2020

(54) HIGH HEAT-RESISTANT POLYAMIC ACID SOLUTION AND POLYIMIDE FILM

(71) Applicant: KOLON INDUSTRIES, INC., Gwacheon-si, Gyeonggi-do (KR)

(72) Inventors: Woong Ki Min, Yongin-si (KR); Hyo Jun Park, Yongin-si (KR); Hak Gee Jung, Yongin-si (KR); Ki Il Hong, Yongin-si (KR)

(73) Assignee: KOLON INDUSTRIES, INC., Seoul (KR)

( * ) Notice: Subject to any disclaimer, the term of this patent is extended or adjusted under 35 U.S.C. 154(b) by 0 days.

(21) Appl. No.: 15/322,957

(22) PCT Filed: Jun. 30, 2015

(86) PCT No.: PCT/KR2015/006666
§ 371 (c)(1),
(2) Date: Dec. 29, 2016

(87) PCT Pub. No.: WO2016/003146
PCT Pub. Date: Jan. 7, 2016

(65) Prior Publication Data
US 2017/0233575 A1 Aug. 17, 2017

(30) Foreign Application Priority Data

Jun. 30, 2014 (KR) .................. 10-2014-0081403
Jun. 29, 2015 (KR) .................. 10-2015-0091870

(51) Int. Cl.
*C08G 73/10* (2006.01)
*C08L 79/08* (2006.01)
*C08J 5/18* (2006.01)

(52) U.S. Cl.
CPC .............. *C08L 79/08* (2013.01); *C08G 73/10* (2013.01); *C08G 73/1042* (2013.01); *C08J 5/18* (2013.01); *C08J 2379/08* (2013.01)

(58) Field of Classification Search
CPC ............ B01D 2323/30; C08G 73/1042; C08G 73/106; C08G 73/10
See application file for complete search history.

(56) References Cited

U.S. PATENT DOCUMENTS

| | | | |
|---|---|---|---|
| 4,778,872 A | 10/1988 | Sasaki et al. | |
| 5,741,599 A | 4/1998 | Oie et al. | |
| 6,790,930 B1 | 9/2004 | Kikuchi et al. | |
| 2006/0009615 A1 | 1/2006 | Uhara | |
| 2007/0003773 A1 | 1/2007 | Uhara | |
| 2013/0018167 A1* | 1/2013 | Itatani | C08G 73/1042 528/353 |
| 2013/0046057 A1* | 2/2013 | Xiao | C08G 73/101 525/54.24 |

FOREIGN PATENT DOCUMENTS

| | | | |
|---|---|---|---|
| CN | 101327409 | * | 12/2008 |
| JP | 200554172 A | | 3/2005 |
| JP | 2006176581 A | | 7/2006 |
| JP | 2006183040 A | | 7/2006 |
| JP | 200739528 A | | 2/2007 |
| JP | 2008248067 A | | 10/2008 |
| KR | 10-2005-0113235 A | | 12/2005 |
| TW | 201331268 A1 | | 8/2013 |
| WO | 2012081763 A1 | | 6/2012 |

OTHER PUBLICATIONS

International Searching Authority, International Search Report for PCT/KR2015/006666 dated Aug. 25, 2015 [PCT/ISA/210].
Taiwanese Patent Office, Communication issued for TW application No. I535760, dated Dec. 21, 2015.
Japanese Patent Office; Communication dated Nov. 28, 2017 in counterpart Japanese application No. 2016-575755.
European Patent Office; Communication dated Mar. 22, 2018 in counterpart application No. 15815907.9.

* cited by examiner

*Primary Examiner* — Gregory Listvoyb
(74) *Attorney, Agent, or Firm* — Sughrue Mion, PLLC

(57) ABSTRACT

This invention relates to a highly heat-resistant polyamic acid solution and a polyimide film having improved thermal dimensional stability, wherein the polyamic acid solution includes a polymer of a diamine compound, containing 1 to 10 mol % of a carboxylic acid functional group-containing diamine compound based on the total amount of diamine, and a dianhydride compound, and the polyimide film includes polyimide, which is an imidized product of the polyamic acid solution and is configured such that main chains thereof are crosslinked through an amide bond (—CONH—).

2 Claims, No Drawings

HIGH HEAT-RESISTANT POLYAMIC ACID SOLUTION AND POLYIMIDE FILM

CROSS REFERENCE TO RELATED APPLICATIONS

This application is a National Stage of International Application No. PCT/KR2015/006666 filed Jun. 30, 2015, claiming priority based on Korean Patent Application Nos. 10-2014-0081403 filed Jun. 30, 2014 and 10-2015-0091870 filed Jun. 29, 2015, the contents of all of which are incorporated herein by reference in their entirety.

TECHNICAL FIELD

The present invention relates to a highly heat-resistant polyamic acid and polyimide film, and more particularly to a polyamic acid solution, which is polymerized using a diamine having carboxylic acid, and to a highly heat-resistant polyimide film having improved thermal dimensional stability.

BACKGROUND ART

Polyimide exhibits heat resistance, mechanical properties and electrical properties superior to those of other typical resins or engineering plastics, and is thus efficiently utilized in the fabrication of products requiring high heat resistance, including electric and electronic parts. Due to the properties thereof, polyimide resins have been employed in a variety of fields including those of advanced heat-resistant materials, such as automotive materials, aircraft materials, spacecraft materials, etc., and electronic materials such as insulation coating materials, insulating films, semiconductors, electrode protective films for TFT-LCDs, etc. Recently, such a resin is used for display materials such as optical fibers or liquid crystal alignment layers, and is also used for transparent electrode films, either in a manner in which it is contained along with a conductive filler in the films or in a manner in which it is applied on the surface thereof.

Typically, polyimide is synthesized in a manner in which dianhydride and diamine are polymerized in the presence of a solvent to give polyamic acid, which is then heated so as to be dehydrated and cyclized, or in a manner in which a chemical dehydration process is performed using a dehydrating agent so that dehydration and cyclization are carried out.

A polyimide film is manufactured based on the principle of synthesis of polyimide, and is specifically formed through a casting process in which a polyimide precursor, namely a polyamic acid derivative, is applied on a carrier plate and then cured. The casting process includes applying a resin solution on a carrier plate, drying the resin to remove the solvent from the resin, and imidizing the polyimide precursor resin to prepare polyimide.

Meanwhile, polyimide is superior in properties such as heat resistance when manufactured into a film, but is difficult to form into a film due to its rigid rod structure, and is easy to break, making it difficult to perform the manufacturing process. In particular, when a composition comprising p-phenylenediamine and pyromellitic dianhydride is applied on a support and thermally treated, it may foam, may be difficult to form into a film, or may not be separated. When the polyimide film undergoes changes in temperature at high temperatures, it may shrink or expand due to the properties of the film. Here, the extent of shrinkage or expansion of the film is not constant, and thus the use thereof is limited in fields requiring thermal dimensional stability.

Thus, when a polyimide film is used as a substrate for a display device that is recently actively useful, it has to possess thermal stability during high-temperature processing. In the case of a glass substrate for typical use in a display substrate, the coefficient of thermal expansion thereof is approximately 4 ppm/° C., and in order to replace the glass substrate, the polyimide film should satisfy a coefficient of thermal expansion of 10 ppm/° C. or less.

Techniques for the coefficient of thermal expansion or thermal dimensional stability of polyimide include Korean Patent Application Publication No. 10-2012-0073909 (entitled "Polyimide film having excellent high temperature stability and substrate for display device using the same") and International Patent Publication No. WO2010/113412 (entitled "Low-thermal-expansion block polyimide, precursor thereof, and use thereof").

DISCLOSURE

Technical Problem

Therefore, the present invention is intended to provide a highly heat-resistant polyamic acid solution useful in the formation of a highly heat-resistant film, and also to provide a polyimide film having superior thermal dimensional stability.

Technical Solution

A preferred embodiment of the present invention provides a polyamic acid solution, comprising a polymer of a diamine compound and a dianhydride compound, wherein the diamine compound includes 1 to 10 mol % of a carboxylic acid functional group-containing diamine compound based on the total molar amount thereof.

In the polyamic acid solution according to this embodiment, the polymer may be obtained by reacting the diamine compound with the dianhydride compound at a molar ratio ranging from 1:0.95 to 1:1.

In the polyamic acid solution according to this embodiment, the carboxylic acid functional group-containing diamine compound may include at least one selected from the group consisting of 1,3-diaminobenzoic acid (DABA), 3,5-diaminophthalic acid (DAPA), and 4,4-diaminobiphenyl-3,3-tetracarboxylic acid (DATA).

In the polyamic acid solution according to this embodiment, the diamine compound may include 90 to 99 mol % of an aromatic diamine compound based on the total molar amount thereof.

In the polyamic acid solution according to this embodiment, the aromatic diamine compound may include any one or a mixture of two or more selected from the group consisting of oxydianiline (ODA), p-phenylenediamine (pPDA), m-phenylenediamine (mPDA), p methylene dianiline (pMDA), and m-methylene dianiline (mMDA).

In the polyamic acid solution according to this embodiment, the dianhydride compound may include any one or a mixture of two or more selected from the group consisting of pyromellitic dianhydride (1,2,4,5-benzene tetracarboxylic dianhydride (PMDA)), benzophenone tetracarboxylic dianhydride (BTDA), biphenyl tetracarboxylic dianhydride (BPDA), biscarboxyphenyl dimethyl silane dianhydride (SiDA), oxydiphthalic dianhydride (ODPA), bisdicarboxyphenoxy diphenyl sulfide dianhydride (BDSDA), and sulfonyl diphthalic anhydride ($SO_2DPA$).

In the polyamic acid solution according to this embodiment, the polymer may have a weight average molecular weight ranging from 100,000 to 150,000.

In the polyamic acid solution according to this embodiment, the polyamic acid solution may have a viscosity ranging from 50 to 200 ps.

Another embodiment of the present invention provides a polyimide film, comprising polyimide, which is an imidized product of the aforementioned polyamic acid solution and is configured such that main chains thereof are crosslinked through an amide bond (—CONH—).

The polyimide film according to this embodiment may have a coefficient of thermal expansion (CTE) of 5 ppm/°C. or less at a temperature ranging from 50 to 500°C. and a CTE increase index of 10 or less, as defined by Equation 1 below.

$$\text{CTE increase index} = 2^{nd}\ \text{CTE}/1^{st}\ \text{CTE} \qquad \text{<Equation 1>}$$

In Equation 1, $1^{st}$ CTE is a coefficient of thermal expansion first measured in a temperature range of 50 to 500°C. according to a TMA method and $2^{nd}$ CTE is a coefficient of thermal expansion obtained by cooling the first measured sample to room temperature and performing second measurement under the same conditions as in the first measurement (in which $1^{st}$ CTE≤$2^{nd}$ CTE is satisfied).

Also, the polyimide film may have a tensile strength of 250 to 350 MPa, an elastic modulus of 7.0 to 10.0 GPa, and an elongation of 13 to 15%, according to ASTM D882.

Advantageous Effects

According to the present invention, a highly heat-resistant polyamic acid solution useful in the formation of a highly heat-resistant film can be provided, and also, a polyimide film manufactured using the same can exhibit superior thermal dimensional stability.

BEST MODE

An aspect of the present invention addresses a polyamic acid solution, comprising a polymer of a diamine compound and a dianhydride compound, wherein the diamine compound includes 1 to 10 mol % of a carboxylic acid functional group-containing diamine compound based on the total molar amount thereof.

In the polymer of the diamine compound and the dianhydride compound, when the diamine compound includes a carboxylic acid functional group-containing diamine compound, the resulting polyamic acid solution is subjected to typical imidization and film-formation processes, thereby making it easy to obtain a polyimide film having high thermal dimensional stability.

Specifically, when the carboxylic acid functional group-containing diamine compound is used upon copolymerization of polyamic acid, the carboxylic acid functional group contained in the molecular chain of the diamine compound does not directly participate in polymerization with another diamine, but may be left behind between side chains of the polymer. As such, such a carboxylic acid functional group may undergo partial thermal decomposition at high temperatures for imidization during the preparation of a polyimide film through imidization and film-formation processes, but enables the formation of a network structure having a crosslinkage, namely an amide bond (—CONH—) between main chains of the imidized polymer.

Here, polyimide, the main chains of which are crosslinked, may be remarkably increased in heat resistance, especially thermal dimensional stability, compared to polyimide having main chains that are not crosslinked. Furthermore, mechanical properties may be improved.

The carboxylic acid functional group-containing diamine, which plays a role in forming a crosslinked structure, is preferably added in an amount of 1 to 10 mol % based on the total molar amount of the diamine compound. If the amount thereof is less than 1 mol %, the number of connection portions (points of connection or crosslinkage) between main chains is fewer than originally intended, making it difficult to realize a desired improvement in properties. On the other hand, if the amount thereof exceeds 10 mol %, the main chain array of the film may be provided in the form of a ladder-type linear array, as intended, but the main chains may not be connected to each other but may be formed like a mesh structure, thus deteriorating the solubility of the polymer. In severe cases, the polymer may precipitate as a solid in the solution, and may be partially crosslinked, undesirably breaking the resulting film. When the mol % of the above diamine increases within the above range, the thermal dimensional stability of the polyimide film is further improved and the carboxylic acid functional group is responsible for forming a crosslinked structure in the film, ultimately increasing the tensile strength and elastic modulus of the resulting film.

According to a preferred aspect of the present invention, the carboxylic acid functional group-containing diamine compound may include at least one selected from the group consisting of 1,3-diaminobenzoic acid (DABA), 3,5-diaminophthalic acid (DAPA), and 4,4-diaminobiphenyl-3,3-tetracarboxylic acid (DATA). Of them, the use of 4-diaminobiphenyl-3,3-tetracarboxylic acid (DATA) is favorable in terms of improving the coefficient of thermal expansion and mechanical properties due to the presence of two or more crosslinkable functional groups in the main chain thereof.

According to a preferred aspect of the present invention, the diamine may include 90 to 99 mol % of an aromatic diamine compound, in addition to the carboxylic acid functional group-containing diamine compound. The aromatic diamine compound may include any one or a mixture of two or more selected from the group consisting of oxydianiline (ODA), p-phenylenediamine (pPDA), m-phenylenediamine (mPDA), p-methylene dianiline (pMDA), and m-methylene dianiline (mMDA).

According to a preferred aspect of the present invention, the molar ratio of diamine to dianhydride ranges from 1:0.95 to 1:1, preferably 1:0.96 to 1:0.99, and more preferably 1:0.97 to 1:0.98. If the molar amount of dianhydride is less than 0.95 per mol of diamine, the molecular weight may decrease and thus the basic properties of the film may deteriorate, which is undesirable. On the other hand, if the molar amount of dianhydride exceeds 1, the viscosity becomes too high and thus film processing becomes impossible.

According to a preferred aspect of the present invention, the dianhydride compound may include any one or a mixture of two or more selected from the group consisting of pyromellitic dianhydride (1,2,4,5-benzene tetracarboxylic dianhydride (PMDA)), benzophenone tetracarboxylic dianhydride (BTDA), biphenyl tetracarboxylic dianhydride (BPDA), biscarboxyphenyl dimethyl silane dianhydride (SiDA), oxydiphthalic dianhydride (ODPA), bisdicarboxyphenoxy diphenyl sulfide dianhydride (BDSDA), and sulfonyl diphthalic anhydride ($SO_2DPA$).

The aforementioned examples of the diamine compound and the dianhydride compound are preferable in terms of heat resistance and mechanical properties, and also, the carboxylic acid functional group-containing diamine compound is used together in a predetermined molar amount, resulting in a polyimide film having maximized heat resistance, easy formation, and superior mechanical properties.

According to a preferred aspect of the present invention, the organic solvent used for the polyamic acid solution may include at least one polar solvent selected from among m-cresol, N-methyl-2-pyrrolidone (NMP), dimethylformamide (DMF), dimethylacetamide (DMAc), dimethylsulfoxide (DMSO), acetone, and ethyl acetate. Here, the water content in the solvent has to be set to 1000 ppm or less in order to prevent the properties from deteriorating, and preferably 100 ppm or less. Furthermore, the amount of the solvent is preferably 50 to 95 wt %, and more preferably 70 to 90 wt %, based on the total weight of the polyamic acid solution in order to obtain a viscosity suitable for film processing.

The polyamic acid solution of the present invention preferably includes polyamic acid having a weight average molecular weight of 100,000 to 150,000, and preferably has a viscosity of 50 to 200 ps. When the molecular weight and viscosity of the polyamic acid solution of the present invention fall in the above ranges, the resulting film may be prevented from warping or distorting upon exposure to high temperatures during processing even in the case where it is applied to a display substrate, thereby minimizing errors in patterning and changes in dimensions during the processing.

Another aspect of the present invention addresses a polyimide film, comprising polyimide, which is an imidized product of the polyamic acid solution and is configured such that main chains thereof are crosslinked via amide bonds.

The polyimide film of the present invention is obtained by imidizing the polyamic acid solution, which is a polymer of a diamine compound including a carboxylic acid functional group-containing diamine and a dianhydride compound, wherein the carboxylic acid functional group of the carboxylic acid functional group-containing diamine does not directly participate in a polymerization reaction but functions to crosslink main chains to be imidized during the high-temperature processing for imidizing polyamic acid. Here, crosslinking may rely on the formation of amide bonds. The carboxylic acid functional group may undergo partial thermal decomposition during the high-temperature processing but may substantially react with an amine functional group between the main chains of polyimide so that a crosslinking reaction is carried out at high temperatures. Thus, the degree of crosslinking of the polymer of the polyimide film may be improved, thus exhibiting high strength, high elasticity and low shrinkage and making it easy to form a film.

According to a preferred aspect of the present invention, the polyimide film has a coefficient of thermal expansion (CTE) of 5 ppm/° C. or less in the temperature range of 50 to 500° C. and a CTE increase index of 10 or less, as defined by Equation 1 below.

$$\text{CTE increase index} = 2^{nd}\ \text{CTE}/1^{st}\ \text{CTE} \qquad \text{<Equation 1>}$$

In Equation 1, the $1^{st}$ CTE is the coefficient of thermal expansion, which is first measured in the temperature range of 50 to 500° C. according to a TMA method, and the $2^{nd}$ CTE is the coefficient of thermal expansion obtained by cooling the first measured sample to room temperature and performing second measurement under the same conditions as in the first measurement (in which $1^{st}\ \text{CTE} \leq 2^{nd}\ \text{CTE}$ is satisfied).

In the present invention, the CTE (Coefficient of Thermal Expansion) refers to a property of an organic material in which changes in bond length between molecules or atoms with an increase in temperature are represented numerically. In the process of manufacturing a film, an average CTE of less than 5 ppm/° C. is required, and for thermal dimensional stability, the CTE increase index of Equation 1 is preferably 10 or less. If the CTE of the polyimide film exceeds 5 ppm/° C. or the CTE increase index exceeds 10, the film may easily warp or distort when exposed to high temperatures during the processing of a substrate, thus causing errors in patterning and changes in dimensions during the processing, undesirably making it difficult to realize real-world applications thereof.

More specifically, the CTE is measured in a manner in which the temperature is increased up to 50 to 500° C. at a rate of 5 to 10° C./min, and $1^{st}$ CTE is measured and then $2^{nd}$ CTE is measured immediately after cooling to room temperature so as to remove heat hysteresis.

In the foregoing and following description, the term "room temperature" may refer to a temperature ranging from 25 to 50° C.

Also, the $2^{nd}$ CTE is measured under the same measurement conditions as the $1^{st}$ CTE. As such, it should be noted that, when a film sample to be measured absorbs external moisture, CTE cannot be measured because shrinkage behavior may occur in the temperature range in which moisture evaporates.

According to a preferred aspect of the present invention, high strength and high elasticity may be satisfied through crosslinking between main chains of polyimide, and the polyimide film may exhibit a tensile strength of 250 to 350 MPa, an elastic modulus of 7.0 to 10.0 GPa, and an elongation of 13 to 15%, according to ASTM D882.

The method of manufacturing the polyimide film is not particularly limited, and may include the steps of (a) preparing a polyamic acid solution by copolymerizing a diamine compound, including 1 to 10 mol % of a carboxylic acid functional group-containing diamine compound based on the total molar amount thereof, with a dianhydride compound, and (b) casting the polyamic acid solution in the step (a) on a support and performing an imidization process.

The step (a), comprising preparing the polyamic acid solution, is the same as above, and thus a description thereof is omitted, provided that the copolymerization in the step (a) is preferably conducted at a reaction temperature ranging from −20 to 80° for a reaction time ranging from 2 to 48 hr. Furthermore, the copolymerization is more preferably carried out in an inert atmosphere such as argon or nitrogen.

In the present invention, the step (b), comprising casting the polyamic acid solution on the support and performing the imidization process, may be performed without particular limitation so long as it is typically useful in the art, and thermal imidization, chemical imidization, or a combination of thermal imidization and chemical imidization may be applied. Preferably, only thermal imidization is performed in terms of preventing the film from breaking due to a drastic reduction in solubility, that is, solidification, occurring as a result of instantaneously remarkably increasing the molecular weight of a polymer, namely the degree of polymerization.

The thickness of the polyimide film is not particularly limited, but preferably falls in the range of 10 to 20 μm, and more preferably 10 to 15 μm.

MODE FOR INVENTION

Examples

A better understanding of the present invention may be obtained through the following examples which are set forth to illustrate, but are not to be construed to limit the present invention.

Example 1

While nitrogen was passed through a 1 L reactor equipped with a stirrer, a nitrogen injector, a dropping funnel, a temperature controller and a condenser, 715 g of N,N-dimethylacetamide (DMAc) was added to the reactor, the temperature of the reactor was set to 35° C., 43.92 g of p-phenylenediamine (p-PDA), corresponding to 99 mol % based on the total molar amount of diamine (0.405 mol, which is identically applied to Examples 2 and 3 and Comparative Examples 1 to 3), was dissolved therein, and the resultant solution was maintained at 35° C.

Furthermore, the solution was added with 1.02 g of 4,4'-diaminobiphenyl-3,3'-dicarboxylic acid, corresponding to 1 mol % based on the total molar amount of diamine, and 36.18 g of biphenyl tetracarboxylic dianhydride (BPDA), corresponding to 30 mol % based on the total molar amount of dianhydride, reacted for 2 hr, added with 62.60 g of 1,2,4,5-benzene tetracarboxylic dianhydride (PMDA), corresponding to 67 mol % based on the total molar amount of dianhydride, and stirred for 12 hr and thus dissolved and allowed to react. As such, the temperature of the solution was maintained at 35° C., thus yielding a polyamic acid solution having a solid content of 17 wt % and a viscosity of 140 ps.

The solution obtained after termination of the reaction was applied on a support, cast to a thickness of 20 μm, thermally treated using hot air at 200° C. for 30 min to primarily remove the solvent, additionally dried using hot air at 300° C. for 1 hr and at 500° C. for 2 min, and slowly cooled to separate the resulting film from the support, thus obtaining a polyimide film having a thickness of 12 μm.

Example 2

A polyimide film was manufactured in the same manner as in Example 1, with the exception that 42.12 g of p-PDA, corresponding to 95 mol % based on the total molar amount of diamine, and 5.69 g of DATA, corresponding to 5 mol % based thereon, were used. The polyamic acid solution obtained during the manufacturing process of Example 2 had a solid content of 17 wt % and a viscosity of 135 ps.

Example 3

A polyimide film was manufactured in the same manner as in Example 1, with the exception that 39.92 g of p-PDA, corresponding to 90 mol % based on the total molar amount of diamine, and 10.20 g of DATA, corresponding to 10 mol % based thereon, were used. The polyamic acid solution obtained during the manufacturing process of Example 3 had a solid content of 17 wt % and a viscosity of 138 ps.

Comparative Example 1

A polyimide film was manufactured in the same manner as in Example 1, with the exception that 44.40 g of p-PDA, corresponding to 99.1 mol % based on the total molar amount of diamine, and 0.93 g of DATA, corresponding to 0.9 mol % based thereon, were used. The polyamic acid solution obtained during the manufacturing process of Comparative Example 1 had a solid content of 17 wt % and a viscosity of 136 ps.

Comparative Example 2

A polyimide film was manufactured in the same manner as in Example 1, with the exception that 39.48 g of p-PDA, corresponding to 89 mol % based on the total molar amount of diamine, and 11.22 g of DATA, corresponding to 11 mol % based thereon, were used. The polyamic acid solution obtained during the manufacturing process of Comparative Example 2 had a solid content of 17 wt % and a viscosity of 140 ps.

Comparative Example 3

In order to obtain a polyimide film, the same procedure as that of Example 1 was performed, with the exception that 39.90 g of p-PDA, corresponding to 85 mol % based on the total molar amount of diamine, and 11.398 g of DATA, corresponding to 15 mol % based thereon, were used, but the DATA was not dissolved in the solvent, and thus a polyamic acid solution could not be obtained.

Comparative Example 4

A polyimide film was manufactured in the same manner as in Example 1, with the exception that 727 g of N,N-dimethylacetamide (DMAc), 43.14 g of p-PDA, corresponding to 95 mol % based on the total molar amount of diamine (0.398 mol, which is identically applied to Comparative Example 5), 4.62 g of 4,4'-diamino biphenyl (DABP), corresponding to 5 mol % based thereon, 37.07 g of BPDA, corresponding to 30 mol % based on the total molar amount of dianhydride, and 61.37 g of PMDA, corresponding to 67 mol % based thereon, were used. The polyamic acid solution obtained during the manufacturing process of Comparative Example 4 had a solid content of 17 wt % and a viscosity of 148 ps.

Comparative Example 5

A polyimide film was manufactured in the same manner as in Example 1, like Comparative Example 4, with the exception that 738 g of N,N-dimethylacetamide (DMAc), 40.87 g of p-PDA, corresponding to 90 mol % based on the total molar amount of diamine, and 9.24 g of DABP, corresponding to 10 mol % based thereon, were used. The polyamic acid solution obtained during the manufacturing process of Comparative Example 5 had a solid content of 17 wt % and a viscosity of 125 ps.

Evaluation of Properties

The films of Examples 1 to 3 and Comparative Examples 1 to 5 were measured for CTE and mechanical properties as follows. The results are shown in Tables 1 and 2 below.

(1) CTE (Coefficient of Thermal Expansion)

CTE was measured two times using a TMA (Diamond TMA, made by PerkinElmer) through a TMA method, and the heating rate was 10° C./min and a load of 100 mN was applied. Here, the sample to be measured had a width of 4 mm and a length of 23 mm. In the measurement of $1^{st}$ CTE, the CTE was measured in a manner in which a temperature of 50° C. was maintained for 1 min and then increased to 500° C. at a heating rate of 10° C./min under a load of 100 mN (which is defined as the coefficient of thermal expansion of the film, and is referred to as a "$1^{st}$ CTE" based on the measurement sequence). The sample was cooled to room temperature at a rate of 5° C./min after the completion of measurement of the $1^{st}$ CTE. Also, the measurement of the 2nd CTE was performed under the same conditions as in $1^{st}$ CTE, and the $2^{nd}$ CTE was measured in a manner in which a temperature of 50° C. was maintained for 1 min and then increased to 500° C. at a heating rate of 10° C./min under a load of 100 mN.

In the foregoing and following description, the CTE indicates a coefficient of linear thermal expansion.

The 1$^{st}$ CTE and 2$^{nd}$ CTE values thus obtained were substituted into Equation 1 below to thus calculate a CTE increase index.

CTE increase index=2$^{nd}$ CTE/1$^{st}$ CTE  <Equation 1>

In Equation 1, the 1$^{st}$ CTE is the coefficient of thermal expansion, first measured in the temperature range of 50 to 500° C. according to a TMA method, and the 2$^{nd}$ CTE is the coefficient of thermal expansion obtained by cooling the first measured sample to room temperature and performing second measurement under the same conditions as in the first measurement (in which 1$^{st}$ CTE≤2$^{nd}$ CTE is satisfied).

(2) Mechanical Properties

Tensile strength, elastic modulus and elongation were measured based on ASTM D882 using Instron 5967. Each sample had a size of 13 mm×100 mm, a load cell was 1 KN, a tension rate was 50 mm/min, and the individual properties thereof were measured seven times, and the average value thereof, excluding the maximum and the minimum, was determined.

TABLE 1

| | Composition | Molar ratio (mol %) | Viscosity (Ps) | 1$^{st}$ CTE (ppm/° C.) | 2$^{nd}$ CTE (ppm/° C.) | CTE increase index (%) |
|---|---|---|---|---|---|---|
| Ex. 1 | pPDA + DATA + BPDA + PDMA | 99:1:30:67 | 140 | 0.75 | 3.87 | 5.16 |
| Ex. 2 | | 95:5:30:67 | 135 | 1.23 | 2.59 | 2.10 |
| Ex. 3 | | 90:10:30:67 | 145 | 2.37 | 2.89 | 1.21 |
| C. Ex. 1 | pPDA + DATA + BPDA + PDMA | 99.1:0.9:30:67 | 138 | 0.35 | 5.15 | 14.71 |
| C. Ex. 2 | | 89:11:30:67 | 136 | 1.38 | 15.66 | 11.34 |
| C. Ex. 3 | | 85:15:30:67 | | Not evaluated | | |
| C. Ex. 4 | pPDA + DABP + BPDA + PMDA | 95:5:30:67 | 148 | 0.37 | 5.98 | 16 |
| C. Ex. 5 | | 99:10:30:67 | 125 | 0.26 | 6.53 | 25 |

Based on the results of measurement of properties, as is apparent from Table 1, when the amount of DATA having a carboxylic acid functional group was 1 to 10 mol % based on the total molar amount of the diamine compound, 2$^{nd}$ CTE was lower than Comparative Examples 1 to 3, in which the amount of DATA fell out of the range of the invention, and thus the CTE increase index was remarkably low.

In Comparative Examples 4 and 5, using DABP having no carboxylic acid functional group compared to DATA as the diamine monomer, 2$^{nd}$ CTE was high and thus the CTE increase index was remarkably high.

Therefore, the polyimide film of the present invention was concluded to have thermal dimensional stability.

TABLE 2

| | Composition | Molar ratio (mol %) | Thickness (μm) | Tensile strength (MPa) | Elastic modulus (GPa) | Elongation (%) |
|---|---|---|---|---|---|---|
| Ex. 1 | pPDA + DATA + BPDA + PDMA | 99:1:30:67 | 13 | 260 | 7.3 | 15 |
| Ex. 2 | | 95:5:30:67 | 12 | 310 | 8.5 | 14 |
| Ex. 3 | | 90:10:30:67 | 15 | 330 | 9.5 | 13 |
| C. Ex. 1 | pPDA + DATA + BPDA + PDMA | 99.1:0.9:30:67 | 11 | 258 | 7.2 | 10 |
| C. Ex. 2 | | 89:11:30:67 | 13 | 333 | 9.6 | 11 |
| C. Ex. 3 | | 85:15:30:67 | | Not evaluated | | |
| C. Ex. 4 | pPDA + DABP + BPDA + PMDA | 95:5:30:67 | 13 | 270 | 7.2 | 12 |
| C. Ex. 5 | | 99:10:30:67 | 14 | 280 | 7.3 | 11 |

Based on the results of measurement of mechanical properties, as is apparent from Table 2, the degree of crosslinkage between chains was increased with an increase in the molar amount of DATA, which enables the crosslinking reaction, whereby both tensile strength and elastic modulus were high. Also, as the amount of diamine having a carboxylic acid functional group increases, the film may become slightly brittle due to the biphenyl structure of diamine, thus decreasing the elongation thereof, which is however regarded as superior compared to when using diamine having no carboxylic acid functional group. If the amount thereof falls out of the range of the present invention, the elongation is drastically decreased, thus deteriorating mechanical properties.

The invention claimed is:

1. A polyimide film, comprising a polyimide, which is an imidized product of a polyamic acid solution and is configured such that main chains thereof are crosslinked through an amide bond (—CONH—),
    wherein the polyamic acid solution comprises a polymer of a diamine compound and a dianhydride compound,
    wherein the diamine compound includes 1 to 10 mol % of a carboxylic acid functional group-containing diamine compound based on a total molar amount of the diamine compound, and
    wherein the polyimide film has a coefficient of thermal expansion (CTE) of 5 ppm/° C. or less at a temperature ranging from 50 to 500° C. and a CTE increase index of 10 or less, as defined by Equation 1 below:

CTE increase index=2nd CTE/1st CTE  <Equation 1> wherein 1st CTE is a coefficient of thermal expansion first measured in a temperature range of 50 to 500° C. according to a TMA (thermomechanical analyzer) method and 2nd CTE is a coefficient of thermal expansion obtained by cooling a first measured sample to room temperature and performing second measurement under the same conditions as in a first measurement, in which 1st CTE≤2nd CTE is satisfied.

2. The polyimide film of claim 1, wherein the polyimide film has a tensile strength of 250 to 350 MPa, an elastic modulus of 7.0 to 10.0 GPa, and an elongation of 13 to 15%, according to ASTM D882.

* * * * *